(12) United States Patent
Ting

(10) Patent No.: US 8,277,771 B2
(45) Date of Patent: Oct. 2, 2012

(54) CONTINUOUS VAPOR GROWN CARBON FIBER, METHOD FOR FABRICATING THE SAME AND APPLICATIONS THEREOF

(75) Inventor: Jyh-Ming Ting, Taipei (TW)

(73) Assignee: National Cheng Kung University, Tainan (TW)

( * ) Notice: Subject to any disclaimer, the term of this patent is extended or adjusted under 35 U.S.C. 154(b) by 763 days.

(21) Appl. No.: 11/889,794

(22) Filed: Aug. 16, 2007

(65) Prior Publication Data

US 2008/0248301 A1 Oct. 9, 2008

(30) Foreign Application Priority Data

Apr. 4, 2007 (TW) ................................. 96111992 A

(51) Int. Cl.
*D01F 9/12* (2006.01)
(52) U.S. Cl. .................................................. 423/447.3
(58) Field of Classification Search ............... 423/447.3; 977/843
See application file for complete search history.

(56) References Cited

U.S. PATENT DOCUMENTS

| 5,283,113 | A  | * | 2/1994  | Nishimura et al. | ........... 442/320 |
| 5,536,486 | A  | * | 7/1996  | Nagata et al.    | ............ 423/447.1 |
| 6,514,113 | B1 | * | 2/2003  | Lee et al.       | ................ 445/50 |
| 6,863,942 | B2 | * | 3/2005  | Ren et al.       | .............. 428/36.9 |
| 7,011,884 | B1 | * | 3/2006  | Chow et al.      | ............... 428/367 |
| 7,615,204 | B2 | * | 11/2009 | Ajayan et al.    | ............ 423/447.2 |

OTHER PUBLICATIONS

Huang et al., 'Oriented Long Single Walled Carbon Nanotubes on Substrates from floating Catalysts' in J. Physical Chemistry B vol. 107 #48 pp. 1 3251-13254 Dec. 2003.*

* cited by examiner

*Primary Examiner* — Stuart Hendrickson
(74) *Attorney, Agent, or Firm* — Bacon & Thomas, PLLC

(57) ABSTRACT

A method for fabricating a continuous vapor grown carbon fiber, comprising: (a) providing a substrate which has a catalyst on its surface; (b) placing said substrate in a furnace; (c) loading said furnace with hydrogen, ammonia, or combinations thereof; (d) adjusting a temperature of said furnace to 400° C. to 900° C. to proceed heat treatment for 10 minutes to 2 hours; (e) adding a carbon-containing compound into said furnace; (f) adjusting the ratio of said carbon-containing compound and said hydrogen, ammonia, or combinations thereof; (g) adjusting the temperature of said furnace to 500° C. to 1200° C. to crack said carbon-containing compound, and thereby form a carbon fiber.

2 Claims, 1 Drawing Sheet

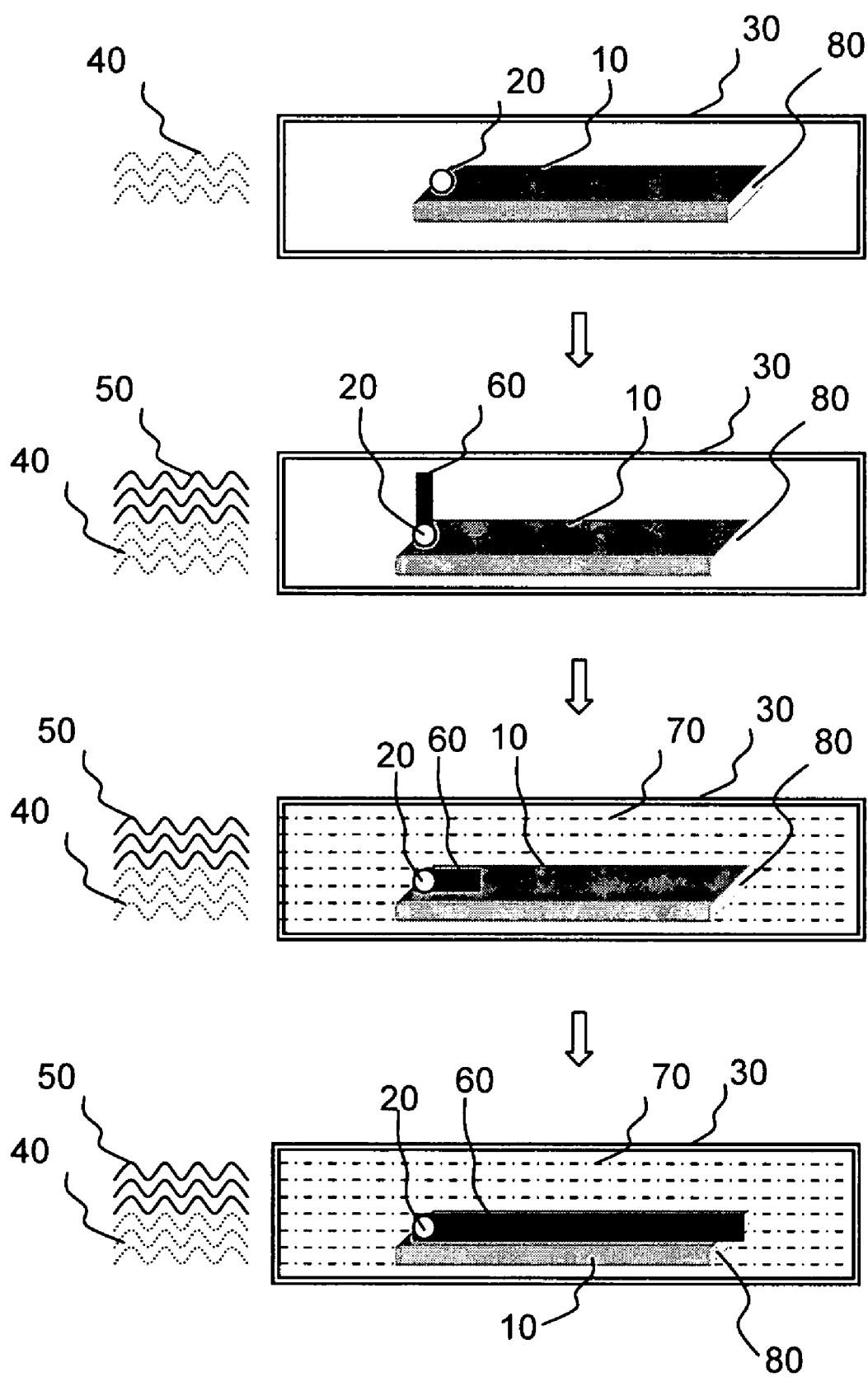

CONTINUOUS VAPOR GROWN CARBON FIBER, METHOD FOR FABRICATING THE SAME AND APPLICATIONS THEREOF

BACKGROUND OF THE INVENTION

1. Field of the Invention

The present invention relates to a method for fabricating a continuous vapor grown carbon fiber, a continuous vapor grown carbon fiber fabricated by the above-mentioned method, and applications thereof.

2. Description of the Related Art

Various heat elimination problems obstruct the development of electronic technology. In order to promote the functions and speed of accurate processors and graphic elements, it is necessary to elevate their power; however, the increasing power and reducing volume of products make the heat elimination of them a rigorous challenge. There are more or less heat elimination problems in IC, memory, LED and the like, and one of the solutions is using a substrate having high conductivity. For example, one ordinary personal computer has a sufficient space to eliminate heat by forced convection, but an article comprising a LED cannot eliminate heat by the same way; therefore, the use of a substrate having high conductivity will be important in the heat management of said article. But, most conventional materials having high conductivity are metals whose conductivity is limited and cannot response the needs of the heat management in this industry for future. Since then, composite materials having higher conductivity is under development. In those composite materials used for eliminating heat, the most popular reinforced material is carbon fiber. There are various carbon fibers, and the one having highest conductivity is the vapor grown carbon fiber. The density of the vapor grown carbon fiber is ¼ or less than that of copper, and the room temperature thermal conductivity of a graphitized vapor grown carbon fiber is at most 1950 W/m-K which is approximately five times higher than that of copper. Moreover, the resistance of the vapor grown carbon fiber is extreme low, i.e. about 0.6 $\mu\Omega \cdot m$, which is similar to that of titanium. The vapor grown carbon fiber has the best conductivity and resistance, and it also has good tensile stress and stretching coefficient; therefore, the vapor grown carbon fiber is excellent for developing composite materials having high conductivity.

The traditional vapor grown carbon fibers are short fibers having a length of at most hundreds micrometers, so the composite materials fabricated by these short fibers have lots of discontinuity, which restrict the conductivity of heat, and thereby the conductivity of these composite materials is merely equal to or lower than that of aluminum. In other words, although the vapor grown carbon fiber has a thermal conductivity of as high as 1950 W/m-K, but the composite materials fabricated by discontinuous short fibers do not have the expected heat elimination effect. In order to make the composite materials have the advantageous high conductivity from vapor grown carbon fibers, it is necessary to increase the length of them. Thus, the method for developing a vapor grown carbon fiber having a continuous structure and a length to be increased dramatically is a very important issue.

SUMMARY OF THE INVENTION

In view of the disadvantages of conventional technology, one object of the present invention is to provide a method for fabricating a continuous vapor grown carbon fiber. In comparison with the conventional method, the present invention has an advantage that it obtains a continuous vapor grown carbon fiber having a length in the order of $10^1$ cm. Practically speaking, the length of carbon fiber obtained by the present invention is reasonably equal to the length of the substrate placed in the furnace. Since then, the operators can fabricate a continuous vapor grown carbon fiber having a length much longer than the traditional carbon fibers by the method disclosed in the present invention with using a substrate as long as the length of the carbon fiber needed.

Another object of the present invention is to provide a continuous vapor grown carbon fiber fabricated by the method disclosed in the present invention, which not only has a continuous structure and a length scale of the order of $10^1$ cm, but also has low density and high conductivity. This carbon fiber has a continuous structure because of gravity and the gas flow velocity in the furnace. The diameter of said fiber is from nearly one micrometer ($\mu m$) to several ten micrometers, and the length of it is same as the substrate. Because the carbon fiber disclosed in the present invention has a continuous structure, its high conductivity can be transferred to the composite materials comprising it, and thereby said composite materials obtain excellent heat elimination effect.

Yet another object of the present invention is to provide a graphitized continuous vapor grown carbon fiber, which is obtained by heating the above-mentioned continuous vapor grown carbon fiber in inert gases, and has a room temperature thermal conductivity of at most 1950 W/m-K. The composite materials comprising said graphitized continuous vapor grown carbon fiber can successfully overcome the problems of thermal conductivity resulted from the discontinuous structure of the traditional vapor grown carbon fiber, and dramatically increase the conductivity of said composite materials.

To achieve the above objects, the present invention provides a method for fabricating a continuous vapor grown carbon fiber, comprising:

(a) providing a substrate which has a catalyst on its surface;
(b) placing said substrate in a furnace;
(c) loading said furnace with hydrogen, ammonia, or combinations thereof;
(d) adjusting the temperature of said furnace to 400° C. to 900° C. to proceed heat treatment for 10 minutes to 2 hours;
(e) adding a carbon-containing compound into said furnace;
(f) adjusting the ratio of said carbon-containing compound and said hydrogen, ammonia, or combinations thereof;
(g) adjusting the temperature of said furnace to 500° C. to 1200° C. to crack said carbon-containing compound, and thereby forming a carbon fiber.

In the preferred embodiments, said catalyst is a transition metal, an alloy comprising one or more transition metals, or a compound comprising one or more transition metals; and the form of said catalyst is powder, solution, or film.

In the preferred embodiments, said furnace is a horizontal furnace or a vertical furnace.

In the preferred embodiments, said method further comprising another step between step (b) and step (c): loading argon in said furnace and heating to 400° C. to 600° C.

In the preferred embodiments, the temperature of said heat treatment in step (d) is 500° C. to 800° C.

In the preferred embodiments, the time of said heat treatment in step (d) is 20 minutes to 1 hour.

In the preferred embodiments, said carbon-containing compound in step (e) comprises a hydrocarbon, a carbon-containing organic compound, or a solid carbon source; said hydrocarbon comprises methane, ethane, propane, butane, pentane, hexane, ethane, ethyne, or benzene; said carbon-containing organic compound comprises alcohols, acids, natural gas, petroleum, or mixtures thereof, in which said alcohols comprise methanol, ethanol, or propanol, and said acids comprise formic acid, acetic acid, or propionic acid; and said solid carbon source comprises coal, charcoal, coke, carbon black, or mixtures thereof.

In the preferred embodiments, the ratio of said carbon-containing compound and said hydrogen, ammonia, or combinations thereof in step (f) is preferably 1% to 100%, and more preferably 5% to 80%.

In the preferred embodiments, the temperature of cracking said carbon-containing compound in step (g) is 700° C. to 1100° C.

In the preferred embodiments, said carbon-containing compound in step (g) is cracked to carbon elements, said carbon elements are absorbed on said catalyst at 600° C. to 1200° C., diffused into the catalyst, and then formed a carbon fiber.

In the preferred embodiments, said carbon fiber formed in step (g) bends and lies on said substrate by gravity and the gas flow velocity in said furnace, and grows along the direction of the gas flow in said furnace.

In the preferred embodiments, the gas flow velocity in said furnace is limited in the following range: the volume of gases entering said furnace per minute is higher than 1% of the volume of said furnace and lower than 10% of the volume of said furnace.

The present invention also provides a continuous vapor grown carbon fiber fabricated by any one of above-mentioned methods, which has high conductivity and a continuous structure.

Yet the present invention provides a graphitized continuous vapor grown carbon fiber, which is obtained by heating the above-mentioned continuous vapor grown carbon fiber in inert gases at 2600° C. to 3000° C., and has a room temperature thermal conductivity of 1450 W/m-K to 1950 W/m-K.

From above, the present invention provides a method for fabricating a continuous vapor grown carbon fiber. In comparison with the conventional method, the present invention has an advantage that it obtains a continuous vapor grown carbon fiber having low density, high conductivity and excellent mechanical property, which is advantageous to be used in photonics industry.

BRIEF DESCRIPTION OF THE DRAWINGS

FIG. 1 is a schematic illustration that depicts the growth of the continuous vapor grown carbon fiber disclosed in the present invention.

DETAILED DESCRIPTION OF THE PRESENT INVENTION

Those skilled in the art can clearly understand the characteristics and advantages of the present invention by reading the following detail description and referring to the appended drawings and claims.

The Preferred Embodiments of this Invention

In the present invention, a furnace is used to fabricate a continuous vapor grown carbon fiber by the process illustrated in FIG. 1.

As shown in FIG. 1, a substrate 10 having a catalyst 20 on its surface is placed in a furnace 30 where the atmosphere is able to be controlled. The form of said catalyst 20 can be particles or a film, for example, it is formed as particles in FIG. 1. The furnace 30 can be a horizontal furnace or a vertical furnace, and preferably a horizontal one. And the catalyst 20 is preferably a transition metal, an alloy comprising one or more transition metals, or a compound comprising one or more transition metals, for example, iron, cobalt or nickel; and it is most preferably iron.

Hydrogen, ammonia, or combinations thereof 40 is loaded into the furnace 30. The temperature of the furnace 30 is adjusted, and then the catalyst 20 is heated in the reaction zone of said furnace 30 at the optimal temperature for a proper time. The length of the substrate 10 is equal to the length of the reaction zone. The optimal heating temperature is 400° C. to 900° C., and it is preferably 500° C. to 800° C. In addition, the proper heating time is 10 minutes to 2 hours, and it is preferably 20 minutes to 1 hour.

Subsequently, a carbon-containing compound 50 is added to the furnace 30, and the ratio of the carbon-containing compound 50 and the hydrogen, ammonia, or combinations thereof 40 is adjusted to fabricate the vapor grown carbon fiber. The carbon-containing compound 50 comprises a hydrocarbon, a carbon-containing organic compound, or a solid carbon source; the hydrocarbon comprises methane, ethane, propane, butane, pentane, hexane, ethene, ethyne, or benzene, and preferably methane, ethyne, or combinations thereof; the carbon-containing organic compound comprises alcohols, acids, natural gas, petroleum, or mixtures thereof, in which the alcohols comprise methanol, ethanol, or propanol, and the acids comprise formic acid, acetic acid, or propionic acid; and the solid carbon source comprises coal, charcoal, coke, carbon black, and mixtures thereof. In addition, the ratio of the carbon-containing compound 50 and the hydrogen, ammonia, or combinations thereof 40 is 1% to 100%, and it is preferably 5% to 80%.

The carbon-containing compound 50 can be treated by the heat-treated catalyst 20 in the reaction zone at the optimal temperature and cracked to carbon elements. The cracking temperature is 500° C. to 1200° C., and it is preferably 700° C. to 1100° C. These carbon elements are absorbed on the catalyst 20 at 600° C. to 1200° C., diffused into the catalyst 20, and then formed a carbon fiber 60.

The carbon fiber 60 grows at 600° C. to 1200° C. The length and diameter of the carbon fiber 60 are dependent on the temperature, the species and concentration of the carbon-containing compound 50 and time. After said carbon fiber 60 grows continuously to a certain length, it will bend and lay on the substrate 10 by gravity and the gas flow velocity 70 in the furnace 30, and grow along the direction of the gas flow. The gas flow velocity 70 is limited in the following range: the volume of gases entering the furnace 30 per minute is higher than 1% of the volume of the furnace 30 and lower than 10% of the volume of the furnace 30.

The carbon fiber 60, which bends and grows along the direction of the gas flow, will continuously grow until its end 80 exceeds the reaction zone, i.e. longer than the length of the substrate 10. During this growing period, the temperature of furnace 30 and the ratio of the carbon-containing compound 50 and the hydrogen, ammonia, or combinations thereof 40 can be adjusted or maintained. The ranges for adjusting the temperature of furnace 30 and the ratio of the carbon-containing compound 50 and the hydrogen, ammonia, or combinations thereof 40 are as the same as those listed in the cracking step.

The length and diameter of this continuous vapor grown carbon fiber are better than those of carbon fibers fabricated by conventional method.

Moreover, the above-mentioned continuous vapor grown carbon fiber can be graphitized by heating in inert gases at 2600° C. to 3000° C. This graphitized continuous vapor grown carbon fiber has a room temperature thermal conductivity of 1450 W/m-K to 1950 W/m-K. The composite materials comprising said graphitized continuous vapor grown carbon fiber can successfully overcome the problems of thermal conductivity resulted from the discontinuous structure of the traditional vapor grown carbon fiber, and dramatically increase the conductivity of said composite materials.

The present invention is demonstrated by the following Examples, but not limited to them.

Example 1

A 15 cm×6 cm substrate having an iron catalyst on its surface is placed in a reaction zone of a horizontal furnace. Argon is loaded into the reaction zone at a mass flow rate of 800 sccm till the gas pressure of the reaction zone reaches one atmosphere. The reaction zone is heated from the room temperature to 700° C., and then argon is replaced with hydrogen by loading hydrogen at a mass flow rate of 100 sccm to proceed heat treatment of the catalyst. After that, the temperature of the reaction zone is further elevated to 1100° C., and methane is loaded into the reaction zone at a mass flow rate of 50 sccm until the concentration of methane is 33% by volume. After 2-hour of dwell time at 1100° C., a continuous vapor grown carbon fiber having a diameter of 5 μm and a length of 15 cm is obtained. The length of the carbon fiber is equal to that of the substrate.

Example 2

The carbon fiber is prepared as in Example 1 except that when the temperature of the reaction zone is further elevated to 1100° C., methane and hydrogen are loaded into the reaction zone at a mass flow rate of 50 sccm and 90 sccm, respectively, until the concentration of methane is 50% by volume. After 2-hour of dwell time at 1100° C., a continuous vapor grown carbon fiber having a diameter of 8 μm and a length of 15 cm is obtained. The length of the carbon fiber is equal to that of the substrate.

Example 3

A 40 cm×10 cm substrate having an iron catalyst on its surface is placed in a reaction zone of a horizontal furnace. Argon is loaded into the reaction zone at a mass flow rate of 1000 sccm till the gas pressure of the reaction zone reaches one atmosphere. The reaction zone is heated to 700° C., and the argon is replaced with hydrogen by loading hydrogen at a mass flow rate of 600 sccm to proceed heat treatment of the catalyst. The time of the heat treatment is 20 minutes. After that, the temperature of the reaction zone is further elevated to 1100° C., and methane is loaded into the reaction zone at a mass flow rate of 300 sccm until the concentration of methane is 33% by volume. After 2-hour of dwell time at 1100° C., a continuous vapor grown carbon fiber having a diameter of 6 μm and a length of 40 cm is obtained. The length of the carbon fiber is equal to that of the substrate.

Example 4

A 47 cm×12 cm substrate having an iron catalyst on its surface is placed in a reaction zone of a horizontal furnace. Argon is loaded into the reaction zone at a mass flow rate of 1000 sccm till the gas pressure of the reaction zone reaches one atmosphere. The reaction zone is heated to 700° C., and the argon is replaced with hydrogen by loading hydrogen at a mass flow rate of 500 sccm to proceed heat treatment of the catalyst. The time of the heat treatment is 20 minutes. After that, the temperature of the reaction zone is further elevated to 1050° C. and the mass flow rate of hydrogen is decreased to 375 sccm, then ethyne is loaded into the reaction zone at a mass flow rate of 125 sccm until the concentration of ethyne is 25% by volume. After 2-hour of dwell time at 1050° C., a continuous vapor grown carbon fiber having a diameter of 8 μm and a length of 47 cm is obtained. The length of the carbon fiber is equal to that of the substrate.

In summary, the present invention provides a continuous vapor grown carbon, fiber fabricated by a chemical vapor grown method, wherein diameter of the carbon fiber is dependent on the conditions of the fabricating process, but the length of said carbon fiber is same as the substrate. Generally speaking, said diameter is from nearly one micrometer (μm) to several ten micrometers, and said length is reasonably equal to the length of the substrate placed in the furnace. Since then, the operators can fabricate a continuous vapor grown carbon fiber having a length much longer than the conventional carbon fiber by the method disclosed in the present invention with using a substrate as long as the length of carbon fiber needed. This continuous vapor grown carbon fiber not only has low density, high conductivity and excellent mechanical property, which is advantageous to be used in photonics industry, but also successfully overcomes the problems of thermal conductivity resulted from the discontinuous structure of the traditional vapor grown carbon fiber, and dramatically increase the conductivity of said composite materials comprising said carbon fiber.

The embodiments and the technical principles used are described above. All variations and modifications of the present invention and the uses thereof are included in the scope of the present invention if they do not depart from the spirit of the disclosure of this specification and drawings.

What is claimed is:

1. A method for fabricating a continuous vapor grown carbon fiber, comprising:
    (a) providing a substrate which has a catalyst on its surface;
    (b) placing said substrate in a furnace said furnace having a reaction zone;
    (c) loading said furnace with hydrogen, ammonia, or combinations thereof until the gas pressure of the reaction zone reaches one atmosphere;
    (d) adjusting the temperature of said furnace to 400° C. to 900° C. to proceed with a heat treatment for 10 minutes to 2 hours;
    (e) adding a carbon-containing compound into said furnace;
    (f) adjusting the ratio of said carbon-containing compound and said hydrogen, ammonia, or combinations thereof until the gas pressure of the reaction zone reaches one atmosphere;
    (g) adjusting the temperature of said furnace to 700° C. to 1200° C. to crack said carbon-containing compound, and thereby forming a carbon fiber having a diameter of from one micrometer to several ten micrometers; and
    wherein said substrate is a 40 cm×10 cm substrate having an iron catalyst on its surface and is placed in said reaction zone of said furnace;
    argon is loaded into said reaction zone at a mass flow rate of 1000 sccm until the gas pressure of said reaction zone reaches one atmosphere, said reaction zone is heated to 700° C.; and
    the argon is replaced with hydrogen by loading hydrogen at a mass flow rate of 600 sccm to proceed with a heat treatment of said catalyst for 20 minutes, after which the temperature of said reaction zone is further elevated to 1100° C., and methane is loaded into said reaction zone at a mass flow rate of 300 sccm until the concentration of methane is 33% by volume and after 2-hours of dwell time at 1100° C., a continuous vapor grown carbon fiber having a diameter of 6 μm and a length of 40 cm is obtained and the length of the carbon fiber is equal to that of the substrate.

2. A method for fabricating a continuous vapor grown carbon fiber, comprising:

(a) providing a substrate which has a catalyst on its surface;
(b) placing said substrate in a furnace said furnace having a reaction zone;
(c) loading said furnace with hydrogen, ammonia, or combinations thereof until the gas pressure of the reaction zone reaches one atmosphere;
(d) adjusting the temperature of said furnace to 400° C. to 900° C. to proceed with a heat treatment for 10 minutes to 2 hours;
(e) adding a carbon-containing compound into said furnace;
(f) adjusting the ratio of said carbon-containing compound and said hydrogen, ammonia, or combinations thereof until the gas pressure of the reaction zone reaches one atmosphere;
(g) adjusting the temperature of said furnace to 700° C. to 1200° C. to crack said carbon-containing compound, and thereby forming a carbon fiber having a diameter of from one micrometer to several ten micrometers; and wherein said substrate is a 47 cm×12 cm substrate having an iron catalyst on its surface and is placed in said reaction zone of said furnace, argon is loaded into said reaction zone at a mass flow rate of 1000 sccm until the gas pressure of the reaction zone reaches one atmosphere, said reaction zone is heated to 700° C.; and the argon is replaced with hydrogen by loading hydrogen at a mass flow rate of 500 sccm to proceed with a heat treatment of the catalyst for 20 minutes, and after which the temperature of said reaction zone is further elevated to 1050° C. and the mass flow rate of hydrogen is decreased to 375 sccm, then ethyne is loaded into said reaction zone at a mass flow rate of 125 sccm until the concentration of ethyne is 25% by volume and after 2-hours of dwell time at 1050° C.;

a continuous vapor grown carbon fiber having a diameter of 8 μm and a length of 47 cm is obtained and the length of the carbon fiber is equal to that of the substrate.

* * * * *